(12) United States Patent
Nishimoto et al.

(10) Patent No.: US 6,240,349 B1
(45) Date of Patent: May 29, 2001

(54) ELECTRIC POWER STEERING APPARATUS

(75) Inventors: Mitsuhiko Nishimoto, Kashihara; Masanori Sugimoto, Kashiwara, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/146,230

(22) Filed: Sep. 2, 1998

(30) Foreign Application Priority Data

Sep. 2, 1997 (JP) .................................................. 9-237538

(51) Int. Cl.⁷ ...................................................... B62D 5/04

(52) U.S. Cl. ............................. 701/41; 701/43; 180/443; 180/446; 280/735; 318/432

(58) Field of Search ........................ 701/41, 43; 180/400, 180/412, 413, 443; 280/735; 318/432, 434

(56) References Cited

U.S. PATENT DOCUMENTS

| | | | |
|---|---|---|---|
| 4,984,647 | * 1/1991 | Morishita et al. | 701/43 |
| 5,200,911 | * 4/1993 | Ishikawa et al. | 701/43 |
| 5,563,790 | * 10/1996 | Wada et al. | 701/41 |
| 5,881,936 | * 3/1999 | Nishimoto et al. | 180/446 |
| 5,984,042 | * 11/1999 | Nishimoto et al. | 180/446 |

FOREIGN PATENT DOCUMENTS 1-178080   7/1989   (JP) .

* cited by examiner

Primary Examiner—William A. Cuchlinski, Jr.
Assistant Examiner—Yonel Beaulieu
(74) Attorney, Agent, or Firm—Darby & Darby

(57) ABSTRACT

An electric power steering apparatus for assisting steering based on an output of a torque sensor which detects a steering torque, the apparatus cumulates the outputs at each detection for a predetermined period of time, then compares the cumulated value with a predetermined value, and detects a displacement of the torque sensor's neutral point based on the comparison result. Therefore it is possible to detect even a small displacement of the torque-sensor neutral point.

15 Claims, 14 Drawing Sheets

United States Patent US 6,240,349 B1

ELECTRIC POWER STEERING APPARATUS

BACKGROUND OF THE INVENTION

The present invention relates to improvement of an electric power steering apparatus for steering assistance based on an output of a torque sensor which detects a steering torque. More particularly, the invention relates to detection of malfunction for the torque sensor.

FIG. 1 is a block diagram showing the constitution of an essential part of the conventional electric power steering apparatus. In the electric power steering apparatus, a steering torque signal from a torque sensor 2 provided on a steering shaft (not illustrated) is phase compensated by a phase compensation unit 11 and given to an assist control unit 12.

Besides, a vehicle speed signal from a vehicle speed sensor 7 is given to the assist control unit 12. The assist control unit 12 outputs a target current value for assist control (steering assist control) based on the steering torque signal from the phase compensation unit 11 and the vehicle speed signal from the vehicle speed sensor 7 and gives the value to subtracting means 15.

The subtracting means 15 obtains a deviation between the target current value from the assist control unit 12 and a feed back value of the drive current of the motor 5 detected by the motor current detection circuit 6, and gives this deviation to the motor drive circuit 16. The motor drive circuit 16 determines a motor current based on the deviation and gives it to the motor 5 to drive it in rotation.

According to the conventional electric power steering apparatus as described above, when an excessively large input is applied to the torque sensor 2, the neutral point in order to the measurement may shift. However, when the displacement by the shift is relatively small, there is a problem that the displacement cannot be detected and the apparatus is doing nothing about the condition that the torque sensor 2 has large measuring errors.

As a prior art on the similar problem, there is disclosed in Japanese Patent Publication Unexamined No. H1-178080 (1989) "A Fail-safe Device for An Electric Power Steering Apparatus", wherein the number of times that the input torque is reached into a certain range is counted independently for the right and left side direction, and when the difference of the number between the right and left counts exceeds a certain level, it is judged that a malfunction has occurred. With the apparatus, the malfunction can be detected only when the displacement is large enough.

BRIEF SUMMARY OF THE INVENTION

The present invention has been made to settle the problematic points as described above. The object of the present invention is to provide an electric power steering apparatus with which even a small displacement of a neutral point in order to a measurement of a torque sensor can be detected.

The electric power steering apparatus of the present invention for assisting steering based on an output of a torque sensor which detects a steering torque, comprises: cumulating means for cumulating the output for a predetermined period of time; comparing means for comparing an absolute value of the result cumulated by the cumulating means with a predetermined value; and means for detecting a displacement of a detection neutral point of the torque sensor based on the results of comparison by the comparing means.

In this electric power steering apparatus, the cumulating means cumulates the output of the torque sensor for the predetermined period of time. The comparing means compares an absolute value of the cumulated value with the predetermined value, and the means for detecting detects the displacement of the neutral point in order to a measurement of a torque sensor based on the results of comparison.

If the output of the neutral point is "0", the cumulated output value of the torque sensor should indicate approximately "0" for a long operating time period. Therefore, if the cumulated value is deviated by more than the predetermined value from "0", then it can be judged that the torque sensor has been failed. Because of this, in case the preset value of the neutral point is "0", even a small displacement of a neutral point in order to a measurement of a torque sensor can be detected.

Another electric power steering apparatus of the present invention for periodically sampling an output of a torque sensor which detects a steering torque and for assisting steering based on the sampled output, comprises: cumulating means for cumulating the output for a predetermined period of time; counting means for counting number of times cumulated by the cumulating means; calculating means for calculating an average value of the output based on the cumulated value cumulated by the cumulating means and the number of times counted by the counting means; means for calculating a difference between a value to be output by the torque sensor at its neutral point and the average value calculated by the calculating means; comparing means for comparing an absolute value of the difference calculated by the calculating means with a predetermined value; and means for detecting a displacement of a detection neutral point of the torque sensor based on the results of comparison by the comparing means.

In this electric power steering apparatus, the output of the torque sensor is periodically sampled and the sampled outputs are cumulated for the predetermined period of time. The counting means counts the number of times cumulated. The calculating means calculates the average output value of the torque sensor based on the cumulated result and the number of times counted. Further, the means for calculating the difference calculates the difference between the expected output value of the torque sensor at its neutral point and the above average output value. Comparing means compares an absolute value of the calculated difference with the predetermined value, and means for detecting the displacement based on the results of the comparison The average output value of the torque sensor should show approximately as that at its neutral point for a long operating time period. Therefore, if the average output value for a long predetermined time is deviated by higher than the predetermined value from the neutral point, then it can be judged that the torque sensor has been failed. Because of this, in case that the preset value of the neutral point is not "0", even a small displacement of a neutral point in order to a measurement of a torque sensor can be detected.

A still further electric power steering apparatus of the invention, further comprises: a vehicle speed sensor for detecting a vehicle speed; and steering angle detecting means for detecting a steering angle, wherein the cumulating means cumulates when the vehicle speed detected by the vehicle speed sensor is higher than a predetermined vehicle speed and the steering angle detected by the steering angle detecting means is within a predetermined range.

In this electric power steering apparatus, the cumulating means cumulates the outputs of the torque sensor when the vehicle speed detected by the vehicle speed sensor is higher than the predetermined vehicle speed and the steering angle detected by the steering angle detecting means is within the predetermined range. Therefore, a small output value of the torque sensor in a condition where the vehicle runs approximately straight becomes the subject of processing, and the detection precision of a small displacement of the neutral point in order to a measurement of the torque sensor can be improved.

Another electric power steering apparatus of the present invention, further comprises: steering angular velocity detecting means for detecting a steering angular velocity, wherein the cumulating means cumulates when the steering angular velocity detected by the steering angular velocity detecting means is lower than a predetermined steering angular velocity In this electric power steering apparatus, the cumulating means cumulates the outputs of the torque sensor when the steering angular velocity detected by the steering angular velocity detecting means is lower than the predetermined steering angular velocity. Therefore, a small output value of the torque sensor in a condition where the vehicle runs approximately straight becomes the subject of processing, and the detection precision of a small displacement of the neutral point in order to a measurement of the torque sensor can be improved Another electric power steering apparatus of the present invention for assisting steering based on an output of a torque sensor which detects a steering torque, comprises: means for detecting an "ON" operation of an ignition key; cumulating means for cumulating the output of the torque sensor at each time a predetermined number of the "ON" operations are detected by the means for detecting; comparing means for comparing an absolute value of the cumulated value cumulated by the cumulating means with a predetermined value; and means for detecting a displacement of a detection neutral point of the torque sensor based on the results comparison by the comparing means.

In this electric power steering apparatus, the means for detecting detects the "ON" operation of the ignition key, and the cumulating means cumulates the outputs of the torque sensor at each time of detecting for a predetermined number of times. The comparing means compares an absolute value of the cumulated value with the predetermined value, and the means for detecting detects the displacement of the detection neutral point of the torque sensor based on the results of the comparison A driver may often keep his/her hands off from the steering wheel while he/she is turning the ignition key to "ON" Thus, when the preset neutral point of the torque sensor is "0", by cumulating the outputs of the torque sensor when the means for detecting detects the "ON" operation of the ignition key, a small torque sensor output becomes the subject of processing, and the detection precision of a small displacement of the neutral point measured by the torque sensor can be improved Another electric power steering apparatus of the present invention for assisting steering based on an output of a torque sensor which detects a steering torque, comprises: means for detecting an "ON" operation of an ignition key; cumulating means for cumulating the output of the torque sensor at each time a predetermined number of the "ON" operations are detected by the means for detecting; calculating means for calculating an average value of the output based on the cumulated value cumulated by the cumulating means; means for calculating the difference between a value to be output by the torque sensor at its neutral point and the average value calculated by the calculating means; comparing means for comparing an absolute value of the difference calculated by the means for calculating with a predetermined value; and means for detecting a displacement of a detection neutral point of the torque sensor based on the results of comparison by the comparing means.

In this electric power steering apparatus, the means for detecting detects the "ON" operation of the ignition key, and the cumulating means cumulates the outputs of the torque sensor when detecting the "ON" operation for a predetermined number of times. The calculating means calculates the average value of the outputs based on the cumulated value, and the means for calculating the difference calculates the difference between the neutral point to be output by the torque sensor at its neutral point and the average value. And, the comparing means compares the value of the calculated difference with the predetermined value, and the means for detecting detects the displacement of the neutral point in order to a measurement of the torque sensor based on the results of the comparison A driver may often keep his/her hands off from the steering wheel while he/she is turning the ignition key to "ON". Thus, when a preset neutral point of the torque sensor is not "0", by cumulating the output of the torque sensor when the means for detecting detects the "ON" operation of the ignition key and obtaining the average value, a small torque sensor output becomes the subject of processing, and the detection precision of a small displacement of the neutral point in order to a measurement of the torque sensor can be improved.

Another electric power steering apparatus of the present invention for assisting steering based on an output of a torque sensor which detects a steering torque, comprises: means for detecting an "OFF" operation of an ignition key; cumulating means for cumulating the output of the torque sensor at each time a predetermined number of the "OFF" operations are detected by the means for detecting; comparing means for comparing an absolute value of the cumulated value cumulated by the cumulating means with a predetermined value; and means for detecting a displacement of a detection neutral point of the torque sensor based on the results of comparison by the comparing means.

In this electric power steering apparatus, the detecting means detects the "OFF" operation of the ignition key, and the cumulating means cumulates the output of the torque sensor when detecting for the predetermined number of times. The comparing means compares an absolute value of the cumulated value with the predetermined value, and the means for detecting detects the displacement of the neutral point in order to a measurement of the torque sensor based on the results of the comparison.

A driver may often keep his/her hands off from the steering wheel while he/she is turning the ignition key to "OFF". Thus, when a preset neutral point of the torque sensor is "0", by cumulating the outputs of the torque sensor when the means for detecting detects the "OFF" operation of the ignition key, a small torque sensor output becomes the subject of processing, and the detection precision of a small displacement of the neutral point in order to a measurement of the torque sensor can be improved.

Another electric power steering apparatus of the present invention for assisting steering based on an output of a torque sensor which detects a steering torque, comprises: means for detecting an "OFF" operation of an ignition key; cumulating means for cumulating the output of the torque sensor at each time a predetermined number of the "OFF" operations are detected by the means for detecting; calculating means for calculating an average value of the output based on the cumulated value cumulated by the cumulating means; means for calculating for calculating a difference between a value to be output by the torque sensor at its neutral point and the average value calculated by the calculating means; comparing means for comparing an absolute value of the difference calculated by the means for calculating with a predetermined value; and means for detecting a displacement of a detection neutral point of the torque sensor based on the results of comparison by the comparing means.

In this electric power steering apparatus, the means for detecting detects the "OFF" operation of the ignition key, and the cumulating means cumulates the output of the torque sensor when detecting the "OFF" operation for the predetermined number of times. The calculating means calculates the average value of the torque sensor outputs based on the cumulated values, and the means for calculating the difference calculates the difference between the value to be output by the torque sensor at the neutral point and the average value. And, the comparing means compares the absolute value of the difference with a predetermined value, and the means for detecting detects the displacement of the neutral point in order to a measurement of the torque sensor based on the results of the comparison.

A driver may often keep his/her hands off from the steering wheel while he/she is turning the ignition key to "OFF". Thus, when a preset neutral point of the torque sensor is not "0", by cumulating the output of the torque sensor when the means for detecting detects the "OFF" operation of the ignition key and obtaining the average value, a small torque sensor output becomes the subject of processing, and the detection precision of a small displacement of the neutral point in order to a measurement of the torque sensor can be improved.

A still further electric power steering apparatus of the present invention, further comprises: means for judging whether or not the output of the torque sensor is within a predetermined range, wherein the cumulating means cumulates when the output is judged to be within the predetermined range by the means for judging.

In the electric power steering apparatus, the cumulating means cumulates when the means for judging judges that the output of the torque sensor is within the predetermined range. Thus, when turning the ignition key to "ON" or "OFF", there is not cumulated such a large output of the torque sensor as when a driver exceptionally exerts a the steering force. Therefore, the output of the torque sensor in an exceptional condition is not cumulated but only a small value becomes the subject of processing, and the detection precision can be improved.

A still further electric power steering apparatus of the present invention for assisting steering based on an output of a torque sensor which includes a mechanical stopper for preventing breakage by over-steering and which detects a steering torque, comprises: stopper detecting means for detecting a reach of the torque sensor to the mechanical stopper; memory means for memorizing the output of the torque sensor when the reach is detected by the stopper detecting means; means for calculating a difference between the output of the torque sensor and the output memorized in the memory means, wherein the output is to be detected after the reach but at a following reach of the torque sensor to the mechanical stopper by the stopper detecting means; comparing means for comparing an absolute value of the difference calculated by the means for calculating with a predetermined value; and means for detecting a displacement of a detection neutral point of the torque sensor based on the results of comparison by the comparing means.

In this electric power steering apparatus, the stopper detecting means detects that the torque sensor reaches to the mechanical stopper. The memory means memorizes the torque sensor output when detected. And, the means for calculating calculates the difference between the output of the torque sensor when detected the reach of the torque sensor to the mechanical stopper and the output memorized in the memory means, the comparing means compares the absolute value of the difference calculated by the means for calculating with the predetermined value, and the means for detecting detects the displacement of the neutral point in order to a measurement of the torque sensor based on the results of the comparison The output of the torque sensor when it reaches to the mechanical stopper is considered as approximately the same (consistent). According to this, by monitoring the deviation, and when the deviation is found to be higher than the predetermined value, it can be judged that the torque sensor has been failed. By this method, even a small displacement of the neutral point in order to a measurement of the torque sensor can be detected The above and further objects and features of the invention will more fully be apparent from the following detailed description with accompanying drawings.

DETAILED DESCRIPTION OF THE INVENTION

Hereinafter, the present invention is described in detail based on the drawings which show the embodiments thereof.

Embodiment 1

Figure 1:
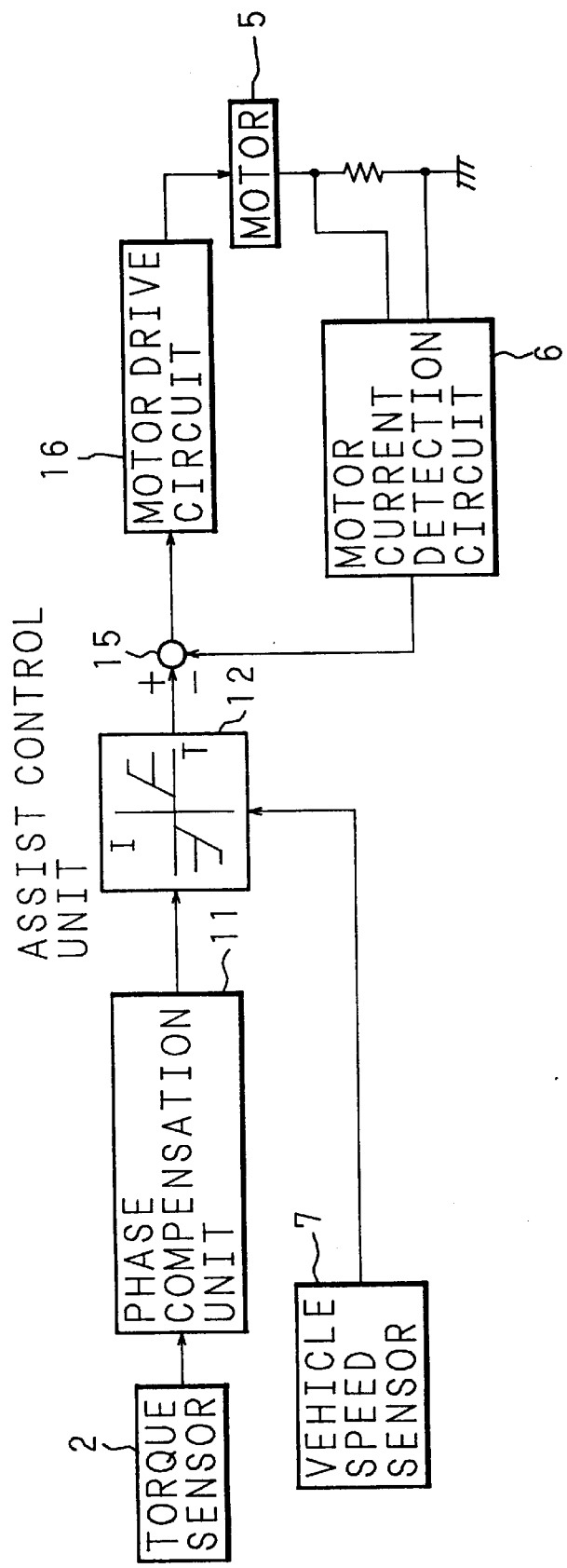
FIG. 1 is a block diagram showing the constitution of the essential part of the conventional electric power steering apparatus.
Figure 2:
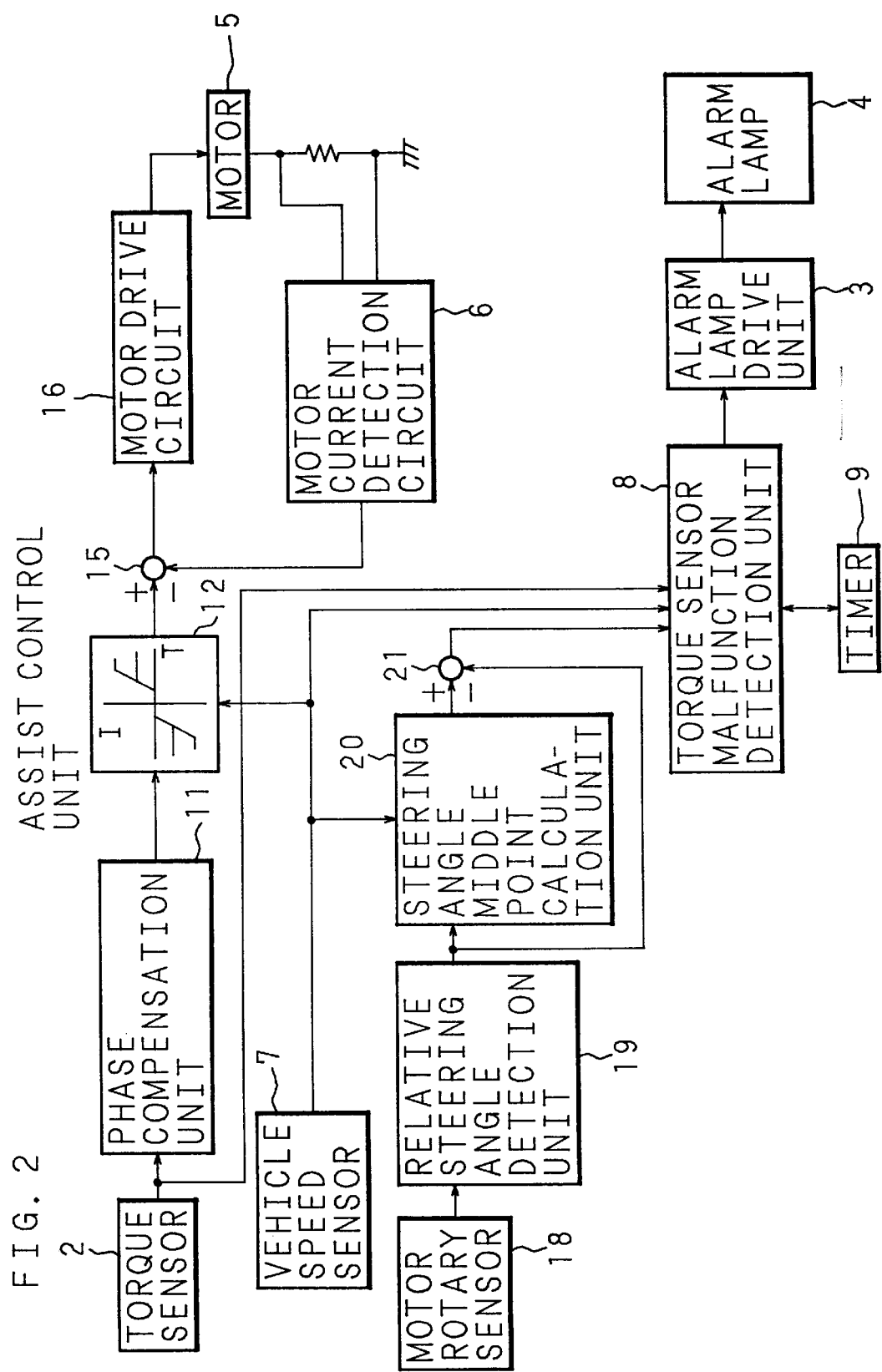
FIG. 2 is a block diagram showing the constitution of the essential part of the electric power steering apparatus according to Embodiment 1 of the present invention.

FIG. 2 is a block diagram showing the constitution of an essential part of the electric power steering apparatus according to Embodiment 1 of the present invention. In the electric power steering apparatus, a steering torque signal as an output of a torque sensor 2 provided on a steering shaft (not illustrated) is periodically sampled. The sampled steering torque signal is phase compensated by a phase compensation unit 11 and given to an assist control unit 12.

Besides, a vehicle speed signal from a vehicle speed sensor 7 is given to the assist control unit 12, a steering angle middle point calculation unit 20, and a torque sensor malfunction detection unit 8. The assist control unit 12 outputs a target current value for assist control (steering assist control) based on the steering torque signal from the phase compensation unit 11 and the vehicle speed signal from the vehicle speed sensor 7.

On the other hand, the steering torque signal which is an output of the torque sensor 2 is also given to the torque sensor malfunction detection unit 8.

A motor rotational speed signal from a motor rotary sensor 18 which detects a rotational speed of a motor 5 for steering force assistance is given to a relative steering angle detection unit 19. The relative steering angle detection unit 19 detects a relative steering angle of a steering wheel based on the motor rotational signal and gives it to the steering middle point calculation unit 20 and a subtracting means 21.

The steering middle point calculation unit 20 calculates a steering middle point of the steering wheel when the vehicle straight based on the given relative steering angle and gives the calculation results thereof to the subtracting means 21. The subtracting means 21 subtracts the given calculation results based on the relative steering angle to obtain the absolute steering angle which is a steering angle from the steering angle middle point, then gives the signal to the torque sensor malfunction detection unit 8.

Although, in this embodiment, there is shown an example of detecting the relative steering angle based on the rotational speed of the motor 5 connected to a steering mechanism, it may be so practiced that, instead of the rotational speed of the motor 5, for example, the relative steering angle may be detected by detecting the rotational speed of a steering shaft connected to the steering wheel by using a rotary encoder. Alternatively, instead of the method of detecting the absolute steering angle by using the relative steering angle detection value, the absolute steering angle may be directly detected.

A subtracting means 15 obtains the deviation between the target current value from the assist control unit 12 and the feed back value of the drive current of the motor 5 detected by a motor current detection circuit 6, and gives the deviation to a motor drive circuit 16. The motor drive circuit 16 determines voltage to be applied to the motor 5 based on this deviation, and gives it to the motor 5 to drive in rotation The torque sensor malfunction detection unit 8 cumulates the value of the steering torque signal which is the output of the torque sensor output 2 for a predetermined period of time counted by a timer 9, when the vehicle speed detected by the vehicle speed sensor 7 is higher than a predetermined vehicle speed and the absolute steering angle given from the subtracting means 21 is within a predetermined range, compares the absolute value of the cumulated value thereof with a predetermined value, and when the it absolute value of cumulated values thereof is higher than a predetermined value, the unit 8 judges that the torque sensor 2 has been failed and turns an alarm lamp 4 on via an alarm lamp drive unit 3.

Figure 3:
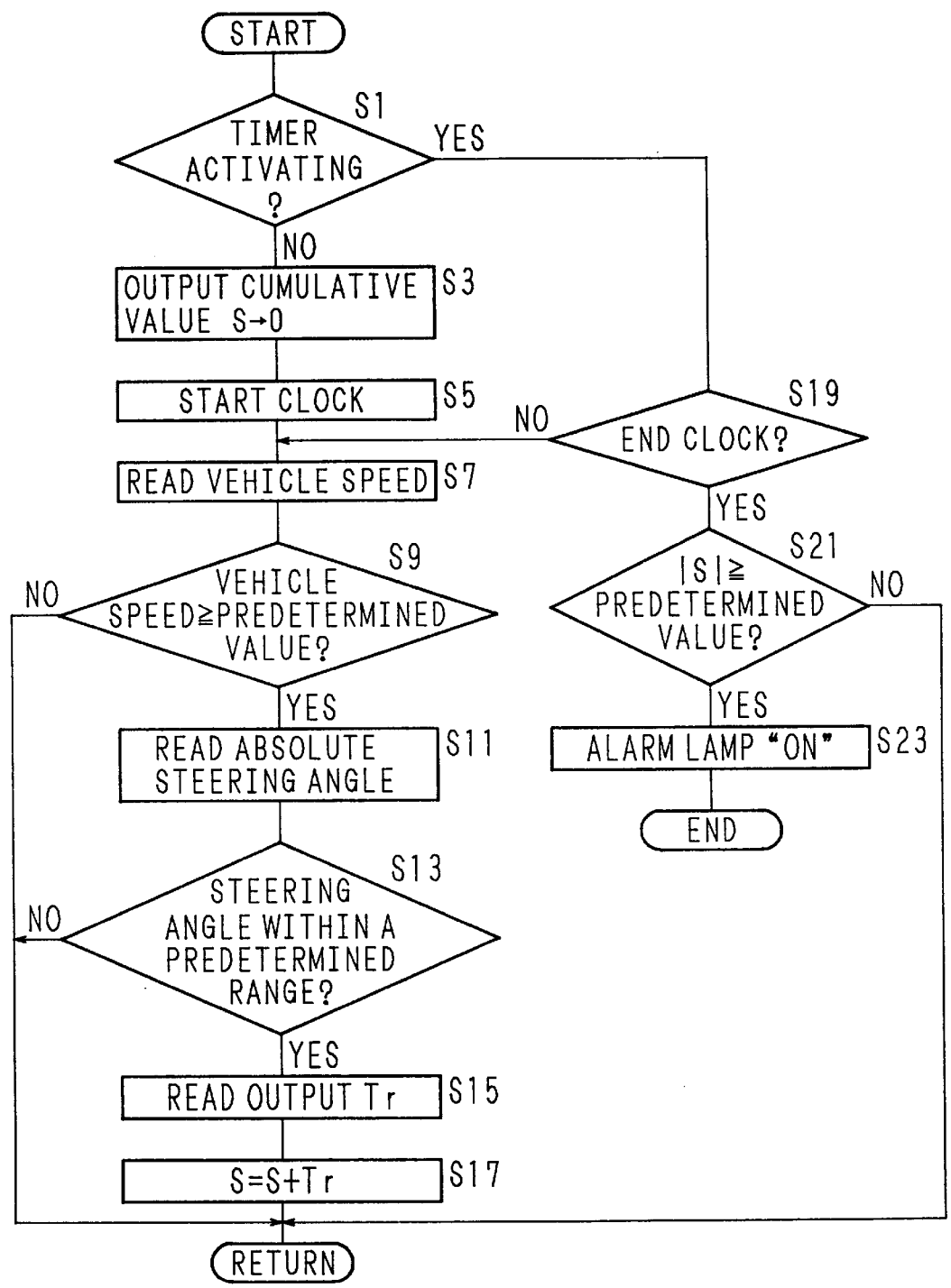
FIG. 3 is a flow chart showing the operation of the electric power steering apparatus according to Embodiment 1 of the present invention.

The control operation of the electric power steering apparatus having the above constitution is-explained below while referring to an the flow chart of FIG. 3 showing it.

FIG. 3 is a flow chart showing the operation of the electric power steering apparatus according to Embodiment 1 of the present invention. First, the torque sensor malfunction detection unit 8 checks whether or not the timer 9 is activated (during time counting or during outputting a time count terminating signal) (S1), and when it is not activated, the unit 8 sets the cumulative value S to be "0" (S3) and starts the timer 9 for the time count (S5).

Next, the torque sensor malfunction detection unit 8 reads the vehicle speed (signal) from the vehicle speed sensor 7 (S7), and checks whether or not the vehicle speed is higher than the predetermined value (S9). When the vehicle speed is higher than the predetermined value, the unit 8 reads the absolute steering angle from the subtracting means 21 (S11), and checks whether or not the absolute steering angle is within the predetermined range (S13).

The torque sensor malfunction detection unit 8, when the absolute steering angle is within the predetermined range, reads a value Tr of the steering torque signal from the torque sensor 2 (S15), and adds the value to the cumulative value S (S17).

The torque sensor malfunction detection unit 8, when the vehicle speed is lower than the predetermined value (S9) or when the absolute steering angle is not within the predetermined range (S13), the unit 8 returns.

The torque sensor malfunction detection unit 8, when the timer 9 is activated (S1) and has completed its time count (S19), compares the absolute value of the cumulative value S with the predetermined value (S21). As a result, when the absolute value of the cumulative value S is higher than the predetermined value, the unit 8 judges that the torque sensor 2 has been failed and turns the alarm lamp 4 on via the alarm lamp drive unit 3 (S23). In case the absolute value of the cumulative value S is lower than the predetermined value (S21), the unit 8 returns.

Embodiment 2

Figure 4:
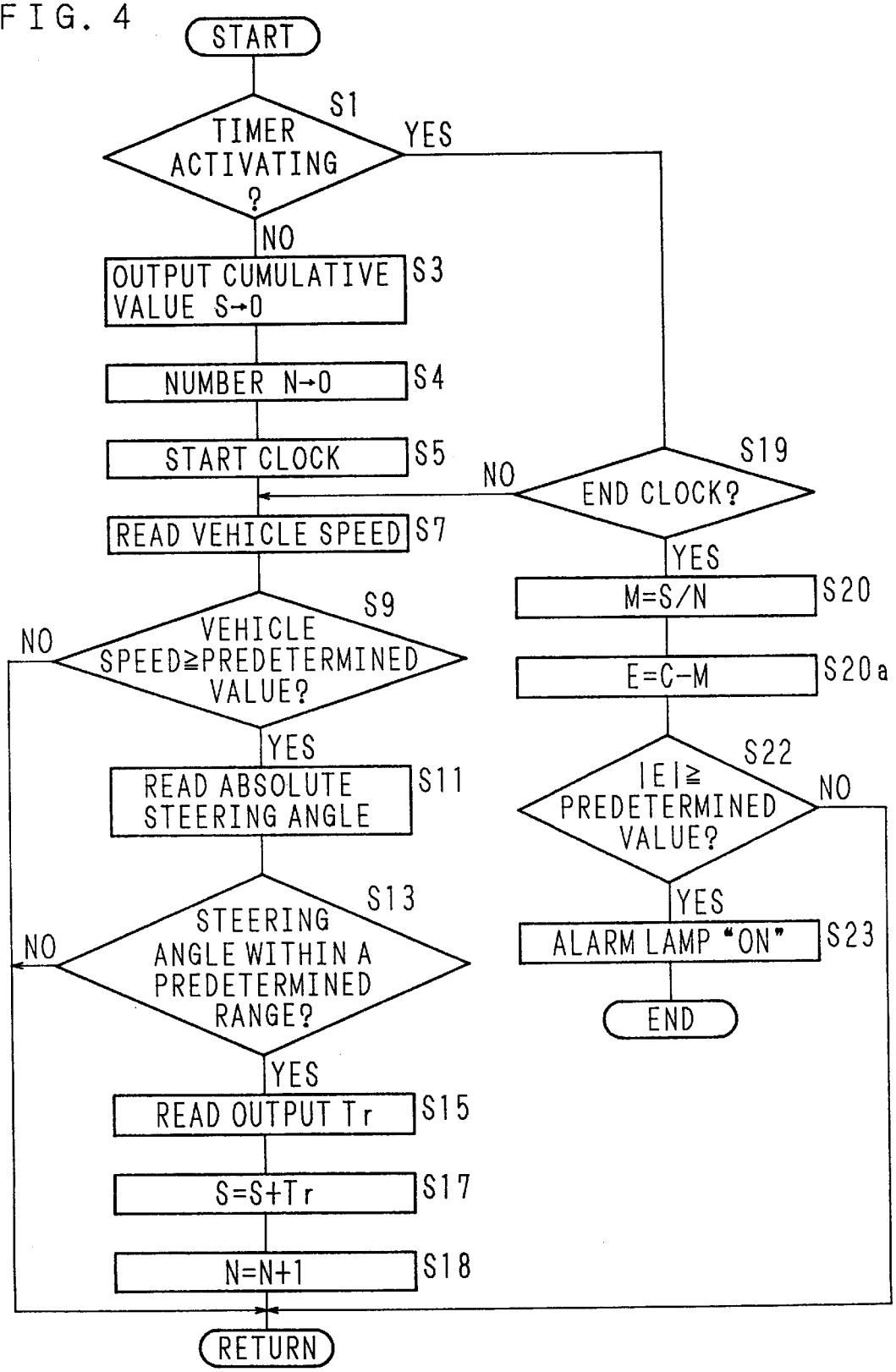
FIG. 4 is a flow chart showing the operation of the electric power steering apparatus according to Embodiment 2 of the present invention.

FIG. 4 is a flow chart showing an operation of the electric power steering apparatus according to Embodiment 2 of the present invention. Since the constitution of the essential part of the electric power steering apparatus according to Embodiment 2 of the present invention is similar to that of the electric power steering apparatus according to Embodiment 1 of the present invention as described above, further description about the constitution will be omitted.

However, when the vehicle speed detected by the vehicle speed sensor 7 is higher than the predetermined vehicle speed and the absolute steering angle given from the subtracting means 21 is within the predetermined range, the torque sensor malfunction detection unit 8 cumulates the value Tr of the steering torque signal from the torque sensor 2 for the predetermined period of time counted by the timer 9, calculates a difference between the average value of the steering torque signal obtained from the cumulated value and the value to be output by the torque sensor 2 at its neutral point, compares the absolute value of the difference with the predetermined value, when the absolute value of the difference is higher than the predetermined value, judges that the torque sensor 2 has been failed, and turns the alarm lamp 4 on via the alarm lamp drive unit 3.

Hereinafter, an operation of the electric power steering apparatus according to Embodiment 2 of the present invention is explained with reference to the flow chart of FIG. 4.

First, the torque sensor malfunction detection unit 8 checks whether or not the timer 9 is activated (during time counting or during outputting time count terminating signal) (S1), and when the timer 9 is not activated, the unit 8 sets the output cumulative value S to "0" (S3) and the cumulated number of times N to "0" (S4), and starts the timer 9 for the time count (S5).

Next, the torque sensor malfunction detection unit 8 reads the vehicle speed (signal) from the vehicle speed sensor 7 (S7) to check whether or not the vehicle speed is higher than the predetermined value (S9). When the vehicle speed is higher than the predetermined value, the unit 8 reads the absolute steering angle from the subtracting means 21 (S11) and checks whether or not the absolute steering angle is within the predetermined range (S13).

When the absolute steering angle is within the predetermined range, the torque sensor malfunction detection unit 8 reads the value Tr of the steering torques signal from the torque sensor 2 (S15), adds it to the cumulative value 5 (S17), and adds "1", to the number of times N (S18).

The torque sensor malfunction detection unit 8 returns when the vehicle speed is lower than the predetermined value (S9) or when the absolute steering angle is not within the predetermined range (S13).

When the timer 9 is activated (S1) and has completed its time count (S19), the torque sensor malfunction detection unit 8 calculates the average value M=S/N of the steering torque signal Tr based on the cumulative value S and the number of times N (S20), and next, calculates the difference E (=C−M) between the value C to be output at the neutral point by the torque sensor 2 and the average value M (S20a).

Next, the torque sensor malfunction detection unit 8 compares the absolute value of the difference E with the predetermined value (S22), and as a result, when the absolute value of the difference E is higher than the predetermined value, the unit 8 judges that the torque sensor 2 is failed, turns the alarm lamp 4 on via the alarm lamp drive unit 3 (S23). In case the absolute value of the difference E is lower than the predetermined value (S22), the unit 8 returns.

Embodiment 3

Figure 5:
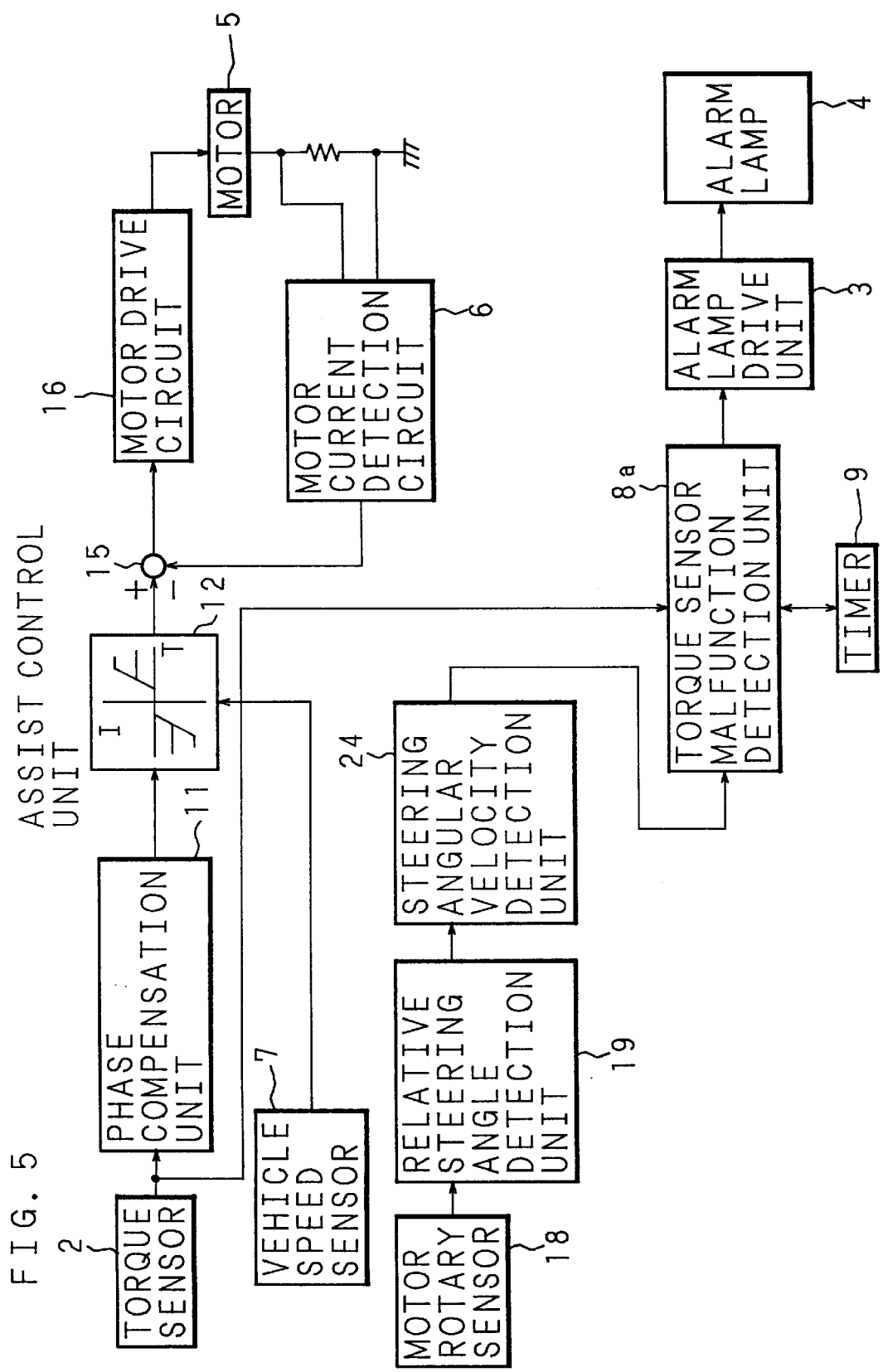
FIG. 5 is a block diagram showing the constitution of the essential part of the electric power steering apparatus according to Embodiment 3 of the present invention.

FIG. 5 is a block diagram showing the constitution of an essential part of the electric power steering apparatus according to Embodiment 3 of the present invention. In this electric power steering apparatus, the vehicle speed signal from the vehicle speed sensor 7 is given to the assist control unit 12.

The motor rotational speed signal from the motor rotary sensor 18 which detects the rotational speed of the motor 5 for steering force assistance is given to the relative steering angle detection unit 19. The relative steering angle detection unit 19 detects the relative steering angle of the steering wheel based on the motor rotational speed signal and gives it to a steering angular velocity detection unit 24. The steering angular velocity detection unit 24 calculates a steering angular velocity based on the given relative steering angle, and gives the calculation results to a torque sensor malfunction detection unit 8a.

When the steering angular velocity detected by the steering angular velocity detection unit 24 is lower than the predetermined steering angular velocity, the torque sensor malfunction detection unit 8a cumulates the value Tr of the steering torque signal from the torque sensor 2 for a predetermined time counted by the timer 9, compares the absolute value of the cumulated value with the predetermined value, and when the absolute value of the cumulated value is higher than the predetermined value, it judges that the torque sensor 2 has been failed, and turns the alarm lamp 4 on via the alarm lamp drive unit 3. Since the constitution of the other part is similar to that of the essential part of the electric power steering apparatus according to Embodiment 1 of the present invention as described above, further description about the constitution will be omitted.

Figure 6:
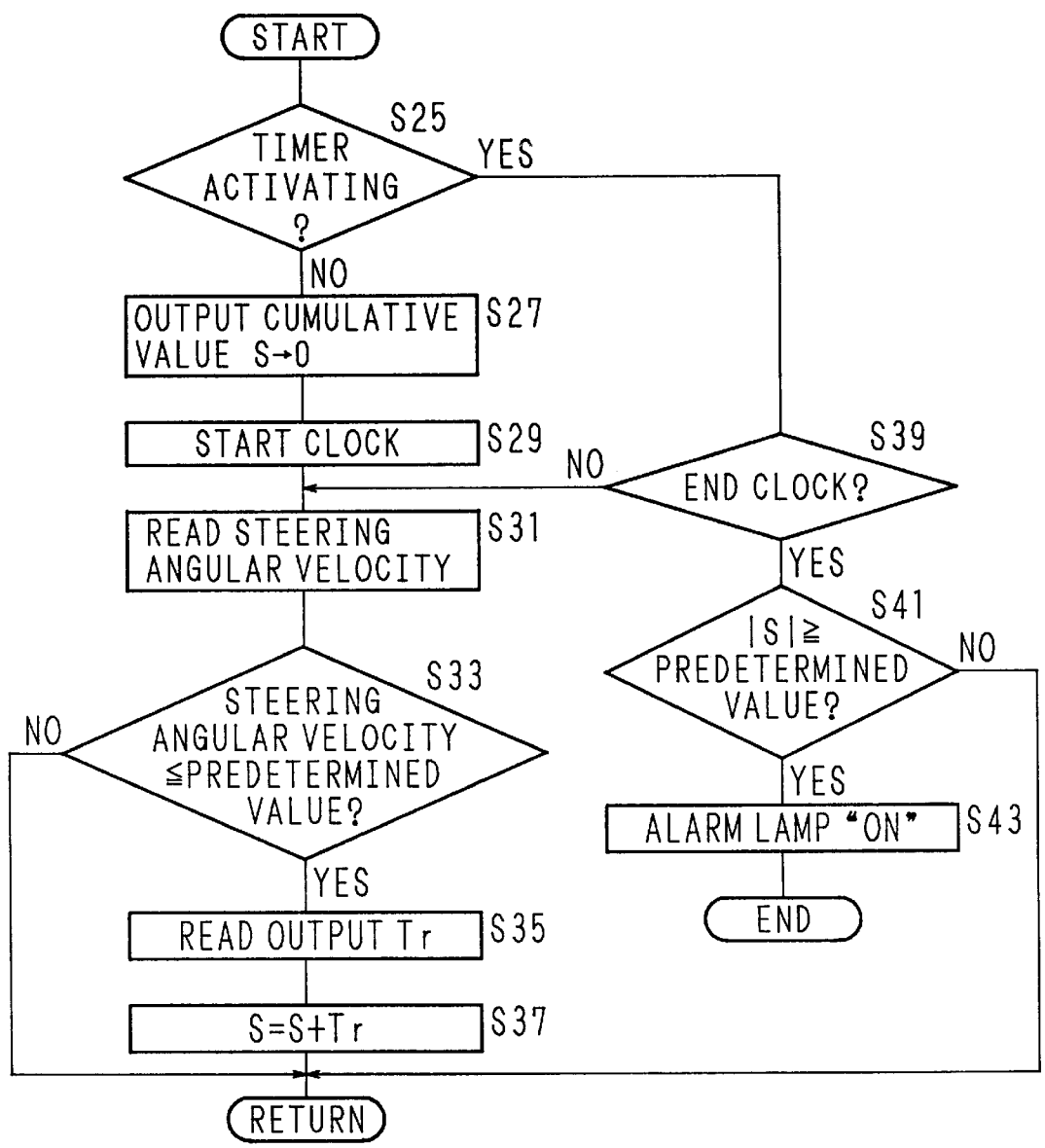
FIG. 6 is a flow chart showing the operation of the electric power steering apparatus according to Embodiment 3 of the present invention.

Hereinafter, an operation of the electric power steering apparatus having the above constitution is explained with reference to the flow chart of FIG. 6 showing it.

FIG. 6 is a flow chart showing the operation of the electric power steering apparatus according to Embodiment 3 of the present invention. At first, the torque sensor malfunction detection unit 8a checks whether or not the timer 9 is activated (S25), and if it is not activated, the unit 8a sets the output cumulated value to "0" (S27) to start the timer 9 for its time count (S29).

Next, the torque sensor malfunction detection unit 8a reads the steering angular velocity from the steering angular velocity detection unit 24 (S31) and checks whether or not the steering angular velocity is lower than the predetermined value (S33). When the steering angular velocity is lower than the predetermined value, the unit 8a reads the value Tr of the steering torque signal from the torque sensor 2 (S35) and adds it to the cumulative value S (S37).

When the steering angular velocity is higher than the predetermined value (S33), the torque sensor malfunction detection unit 8a returns.

When the timer 9 is activated (S25) and has completed its time count (S39), the torque sensor malfunction detection unit 8a compares the absolute value of the cumulative value S with the predetermined value (S41), and as a result, when the absolute value of the cumulative value S is higher than the predetermined value, the unit 8a judges that the torque sensor 2 has been failed, and turns the alarm lamp 4 on via the alarm lamp drive unit 3 (S43). In case the absolute value of the cumulative value S is lower than the predetermined value (S41), the unit 8 returns.

Embodiment 4

Figure 7:
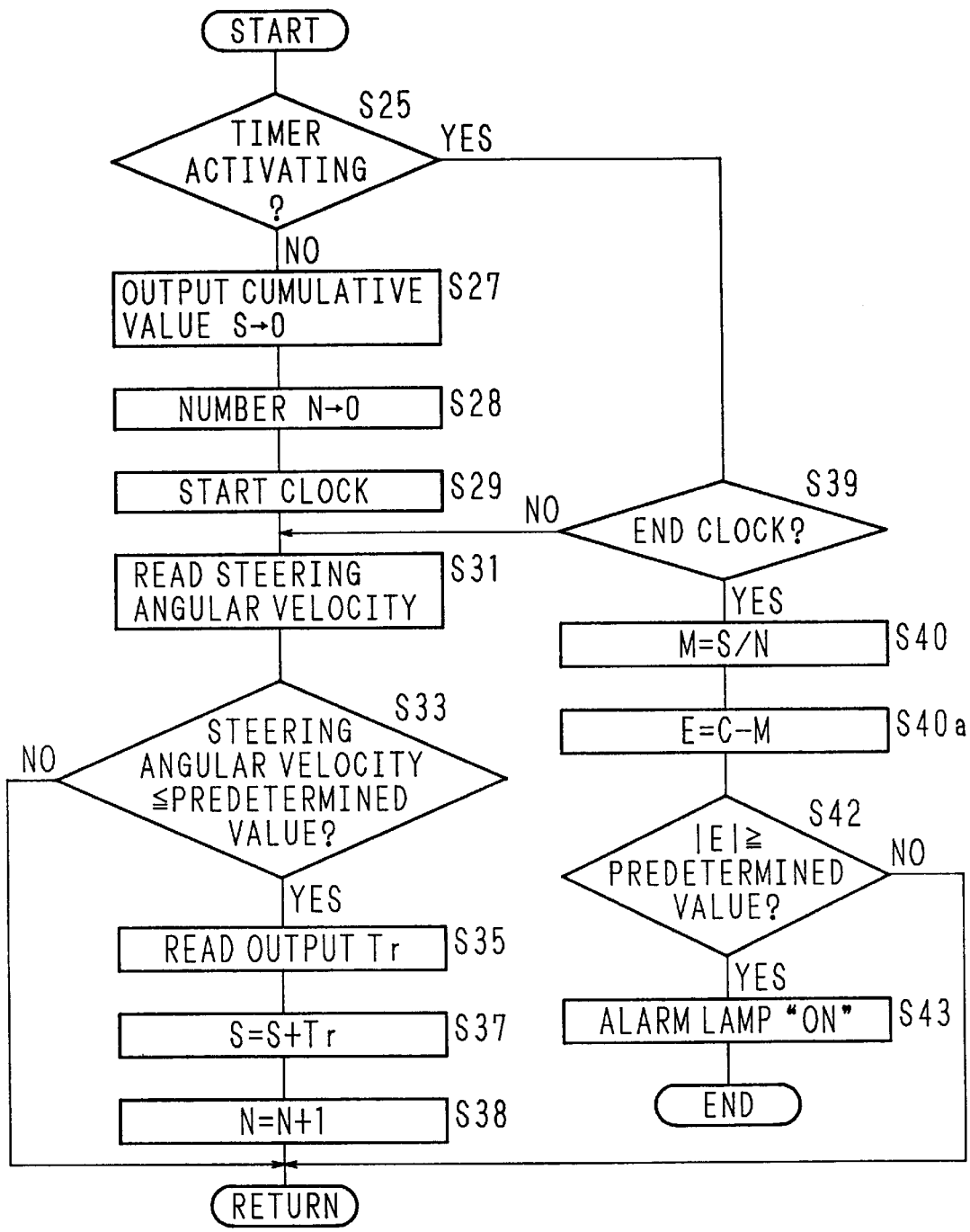
FIG. 7 is a flow chart showing the operation of the electric power steering apparatus according to Embodiment 4 of the present invention.

FIG. 7 is a flow chart showing an operation of the electric power steering apparatus according to Embodiment 4 of the present invention. Since the constitution of the essential part of the electric power steering apparatus according to Embodiment 4 of the present invention is similar to that of the electric power steering apparatus according to Embodiment 3 of the present invention as described above, further description about the constitution will be omitted However, when the steering angular velocity detected by the steering angular velocity detection unit 24 is lower than the predetermined steering angular velocity, the torque sensor malfunction detection unit 8a cumulates the value Tr of the steering torque signal from the torque sensor 2 for a predetermined period of time counted by the timer 9, calculates the difference between an average value of the steering torque signal obtained from the cumulated value and the value to be output by the torque sensor 2 at its neutral point, compares the absolute value of the difference with the predetermined value, and when the absolute value of the difference is higher than the predetermined value, the unit 8a judges that the torque sensor 2 has been failed, and turns the alarm lamp 4 on via the alarm lamp drive unit 3.

Hereinafter, an operation of the electric power steering apparatus according to Embodiment 4 of the present invention is explained with reference to the flow chart of FIG. 7.

At first, the torque sensor malfunction detection unit 8a checks whether or not the timer 9 is activated (S25), and when it is not activated, the unit 8a sets the output cumulative value S to "0" (S27) and the cumulated number of times N to "0", (S28), and activates the timer 9 for its time count (S29).

Next, the torque sensor malfunction detection unit 8a reads the steering angular velocity from the steering angular velocity detection unit 24 (S31) and checks whether or not the steering angular velocity is lower than the predetermined value (S33). When the steering angular velocity is lower than the predetermined value, the unit 8a reads the value Tr of the steering torque signal from the torque sensor 2 (S35), adds it to the cumulative value S (S37), and adds "0" to the number of times N (S38).

When the steering angular velocity is higher than the predetermined value (S33), the torque sensor malfunction detection unit 8a returns.

When the timer 9 is activated (S25) and has completed its time count (S39), the torque sensor malfunction detection unit 8a calculates an average value M=S/N of the steering torque signal Tr based on the cumulative value S and the number of times N (S40), and next, calculates the difference E (=C−M) between the value C to be output by the torque sensor 2 at the neutral point and the average value M (S40a).

Next, the torque sensor malfunction detection unit 8 compares the absolute value of the difference E with the predetermined value (S42), and as a result, then the absolute value of the difference E is higher than the predetermined value, the unit 8 judges that the torque sensor 2 has been failed and turns the alarm lamp 4 on via the alarm lamp drive unit 3 (S43). When the absolute value of the difference E is lower than the predetermined value (S42), the unit 8 returns.

Embodiment 5

Figure 8:
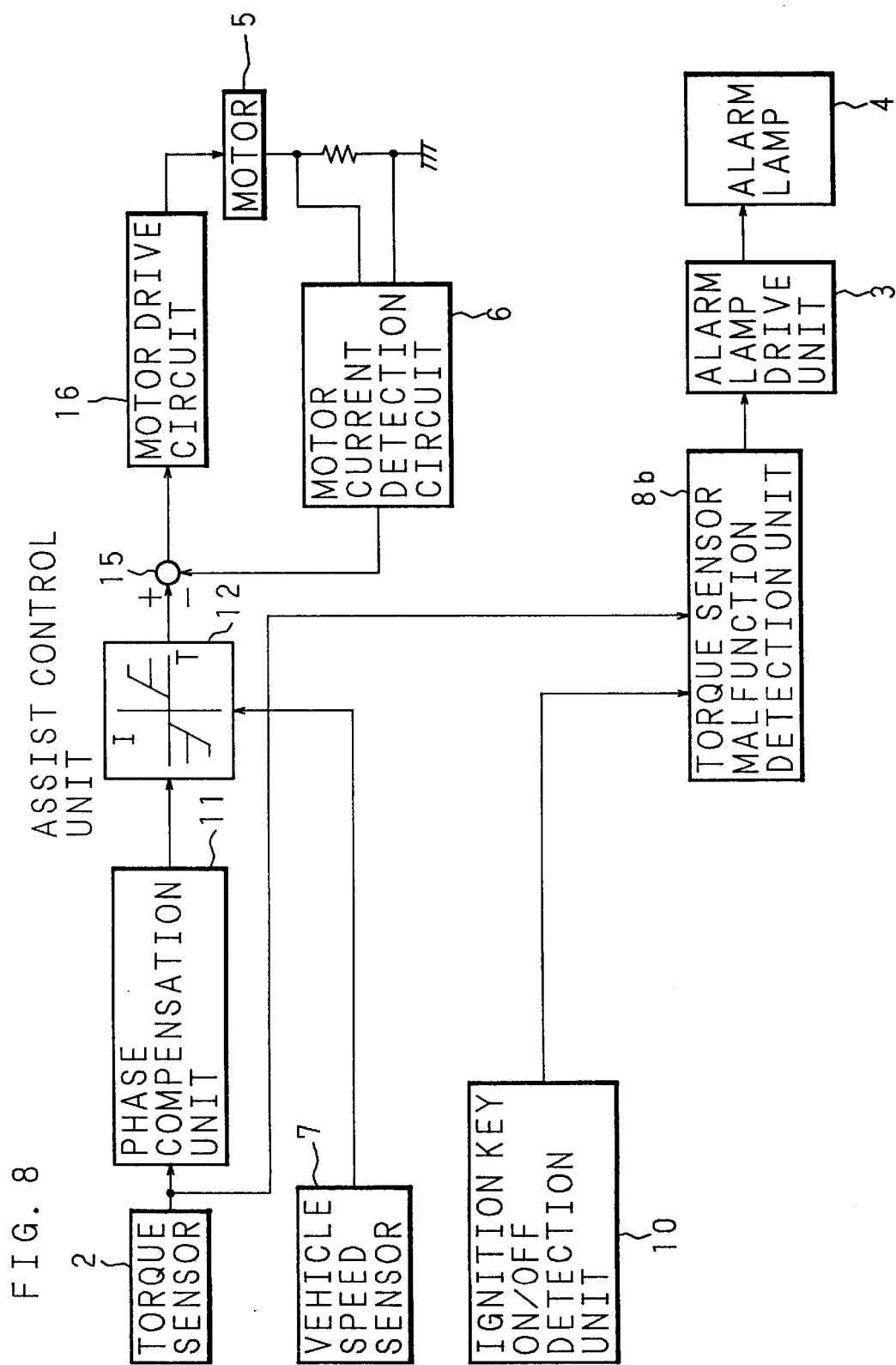
FIG. 8 is a block diagram showing the constitution of the essential part of the electric power steering apparatus according to Embodiment 5 of the present invention.

FIG. 8 is a block diagram showing the constitution of an essential part of the electric power steering apparatus according to Embodiment 5 of the present invention. In this electric power steering apparatus, the vehicle speed signal from the vehicle speed sensor 7 is given to the assist control unit 12.

A detection signal for detecting "ON" or "OFF" of an ignition key (not illustrated) from an ignition key ON/OFF detection unit 10 is given to the torque sensor malfunction detection unit 8b.

When the output value of the torque sensor 2 when the ignition key ON/OFF detection unit 10 has detected the "ON" operation of the ignition key is within a predetermined range, the torque sensor malfunction detection unit 8b cumulates the output values thereof, and when the cumulated number of times reaches the predetermined number of times, the unit 8b compares the absolute value of the cumulated value with a predetermined value, and when the absolute value of the cumulated value is higher than the predetermined value, the unit 8b judges that the torque sensor 2 has been failed, and turns the alarm lamp 4 on via the alarm lamp drive unit 3. Since the other constitution is similar to the constitution of the essential part of the electric power steering apparatus according to Embodiment 1 of the present invention as described above, further description about the constitution will be omitted.

Figure 9:
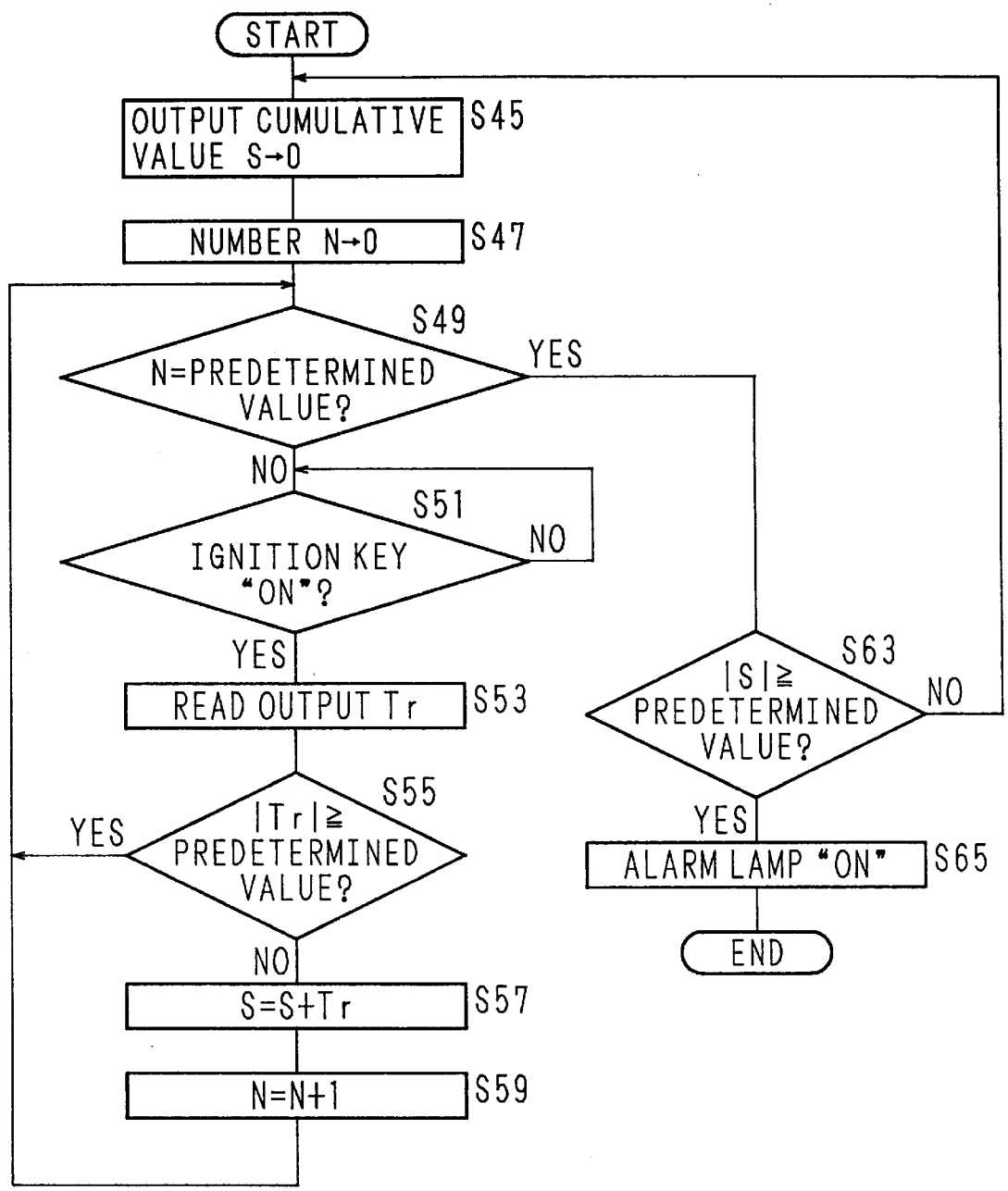
FIG. 9 is a flow chart showing the operation of the electric power steering apparatus according to Embodiment 5 of the present invention.

Hereinafter, an operation of the electric power steering apparatus having the constitution as above is explained with reference to a flow chart of FIG. 9 showing it.

FIG. 9 is a flow chart showing the operation of the electric power steering apparatus according to Embodiment 5 of the present invention. At first the torque sensor malfunction detection unit 8a sets the output cumulative value S to "0" (S45), and turns the cumulated number of times N to "0" (S47). Next, the torque sensor malfunction detection unit 8b checks whether or not the number of times N has reached a predetermined number of times (S49), and when the number of times has not reached the predetermined number of times, the unit 8b waits until the detection signal of "ON" operation of the ignition key is input from the ignition key ON/OFF detection unit 10 (S51).

When the detection signal of the "ON" operation of the ignition key is input from the ignition key ON/OFF detection unit 10 (S51), the torque sensor malfunction detection unit 8b reads the value Tr of the steering torque signal from the torque sensor 2 (S53), and checks whether or not the absolute value of the value Tr is higher than the predetermined value (S55).

When the absolute value of the value Tr is not higher than the predetermined value (when it is within the predetermined range), the torque sensor malfunction detection unit 8b adds the value Tr to the cumulative value S (S57).

Next, the torque sensor malfunction detection unit 8b adds "1" to the number of times N (S59), and checks whether or not the number of times N has reached the predetermined number of times (S49).

When the number of times N has reached the predetermined number of times (S49), the torque sensor malfunction detection unit 8b compares the absolute value of the cumulative value S with the predetermined value (S63), and when the absolute value of the cumulative value S is higher than the predetermined value, the unit 8b judges that the torque sensor 2 has been failed, and turns the alarm lamp 4 on via the alarm lamp drive unit 3 (S65). When the absolute value of the cumulative value S is lower than the predetermined value (S63), the step returns to S45.

Embodiment 6

Figure 10:
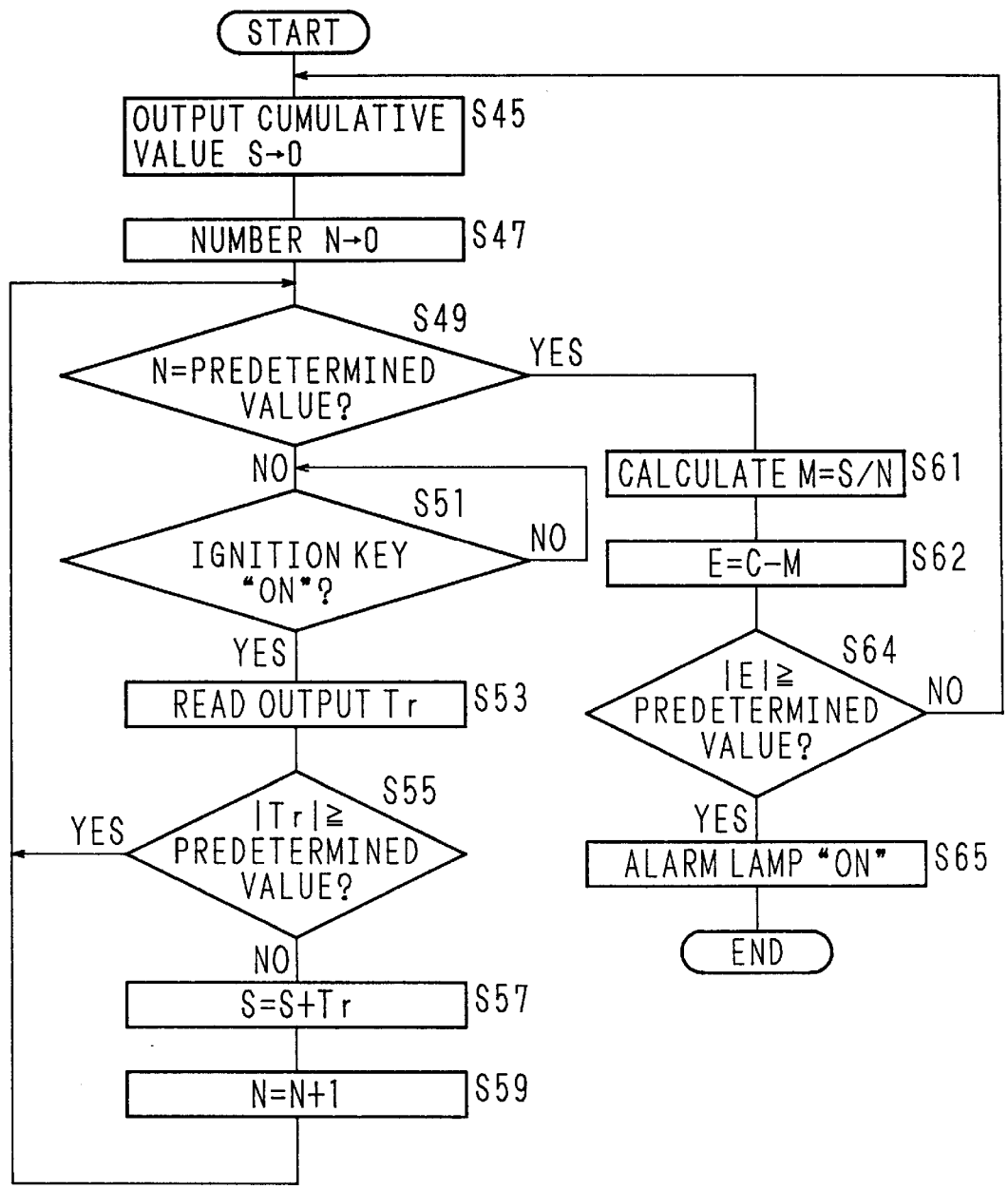
FIG. 10 is a flow chart showing the operation of the electric power steering apparatus according to Embodiment 6 of the present invention.

FIG. 10 is a flow chart showing the operation of the electric power steering apparatus according to Embodiment 6 of the present invention. As the constitution of an essential part of the electric power steering apparatus according to Embodiment 6 of the present invention is similar to the constitution of the essential part of the electric power steering apparatus according to Embodiment 5 of the present invention, further description about the constitution will be omitted.

However, in case that the output of the torque sensor 2 is within the predetermined range when the ignition key ON/OFF detection unit 10 has detected the "ON" operation of the ignition key, the torque sensor malfunction detection unit 8b cumulates the output values thereof, and when the cumulated number of times reaches the predetermined number of times, the unit 8b obtains an average value M of the output values based on the cumulated value. Next, the unit 8b calculates the difference between the value C to be output by the torque sensor 2 at its neutral point and the average value M and compares the absolute value with a predetermined value, and when the absolute value of the difference is higher than the predetermined value, the unit 8b judges that the torque sensor 2 has been failed, and turns the alarm lamp 4 on via the alarm lamp drive unit 3.

Then, the torque sensor malfunction detection unit 8b sets the output cumulative value S "0" (S45), and turns the cumulated number of times N to "0" (S47).

Next, the torque sensor malfunction detection unit 8b checks whether or not the number of times N has reached a predetermined number of times (S49), and if not reached the predetermined number of times, the unit 8*b* waits until the detection signal of an "ON" operation of the ignition key is input from the ignition ON/OFF detection unit 10 (S51).

When the detection signal of the "ON" operation of the ignition key is input from the ignition key ON/OFF detection unit 10 (S51), the torque sensor malfunction detection unit 8*b* reads the value Tr of the steering torque signal from the torque sensor 2 (S53), and checks whether or not the absolute value of the value Tr is higher than the predetermined value (S55).

When the absolute value of the value Tr is not higher than the predetermined value (when it is within the predetermined range), the torque sensor malfunction detection unit 8*b* adds the value Tr to the cumulative value S (S57).

Next, the torque sensor malfunction detection unit 8*b* adds "1" to the number of times N (S59), and checks whether or not the number of times N has reached the predetermined number of times (S49).

When the number of times N has reached the predetermined number of times (S49), the torque sensor malfunction detection unit 8*b* calculates the average value M (=S/N) of the steering torque signal Tr (S61), and next, calculates the difference E(=C−M) between the value C to be output by the torque sensor 2 at its neutral point and the average value M (S62).

Next, the torque sensor malfunction detection unit 8*b* compares the absolute value of the difference E with the predetermined value (S64), and as a result, when the absolute value of the difference E is higher than the predetermined value, the unit 8*b* judges that the torque sensor 2 has been failed, and turns the alarm lamp 4 on via the alarm lamp drive unit 3 (S65). When the absolute value of the difference E is lower than the predetermined value (S64), the step returns to S45.

Embodiment 7

Figure 11:
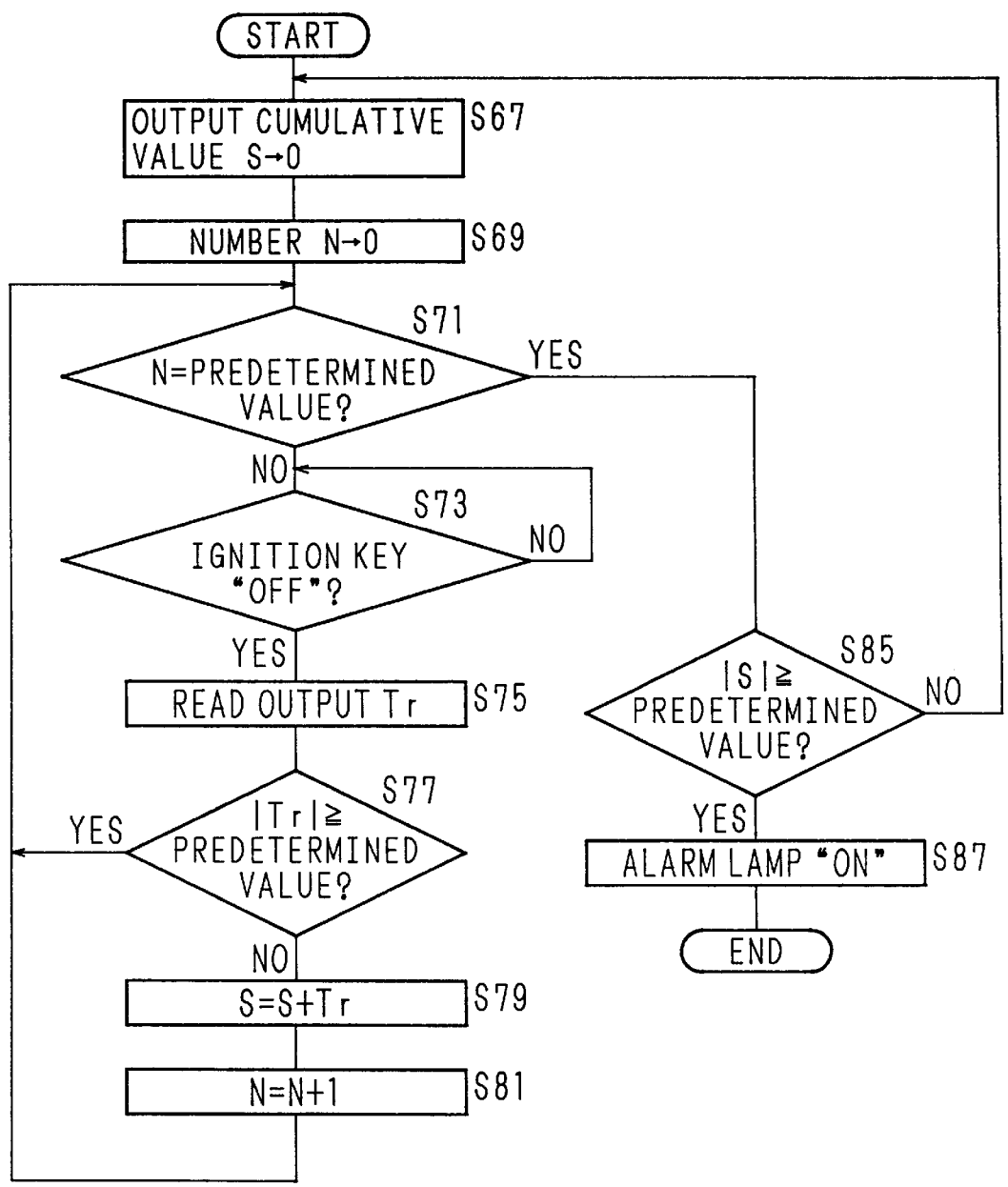
FIG. 11 is a flow chart showing the operation of the electric power steering apparatus according to Embodiment 7 of the present invention.

FIG. 11 is a flow chart showing the operation of the electric power steering apparatus according to Embodiment 7 of the present invention. As the constitution of an essential part of the electric power steering apparatus according to Embodiment 7 of the present invention is similar to the constitution of the essential part of the electric power steering apparatus according to Embodiment 5 of the present invention, further description about the constitution will be omitted, However, what is given to the torque sensor malfunction detection unit 8*b* from the ignition key ON/OFF detection unit 10 is a detection signal of an ignition key "OFF" operation Hereinafter, the operation of the electric power steering apparatus according to Embodiment 7 of the present invention is explained with reference to a flow chart of FIG. 11.

First, the torque sensor malfunction detection unit 8*b* sets the output cumulative value S to "0" (S67), and the cumulated number of times N to be "0" (S69).

Next, the torque sensor malfunction detection unit 8*b* checks whether or not the number of times N has reached a predetermined number of times (S71), and if not reached the predetermined number of times, the unit 8*b* waits until the detection signal of the "OFF" operation of the ignition key is input from the ignition ON/OFF detection unit 10 (S73).

When the detection signal of the "OFF" operation of the ignition key is input from the ignition key ON/OFF detection unit 10 (S73), the torque sensor malfunction detection unit 8*b* reads the value Tr of the steering torque signal from the torque sensor 2 (S75), and checks whether or not the absolute value of the value Tr is higher than the predetermined value (S77).

When the absolute value of the value Tr is not higher than the predetermined value (when it is within the predetermined range), the torque sensor malfunction detection unit 8*b* adds the value Tr to the cumulative value S (S79).

Next, the torque sensor malfunction detection unit 8*b* adds "1" to the number of times N (S81), and checks whether or not the number of times N has reached the predetermined number of times (S71).

When the number of times N has reached the predetermined number of times (S71), the torque sensor malfunction detection unit 8*b* compares the absolute value of the cumulative value S with the predetermined value (S85), and when the absolute value of the cumulated value is higher than the predetermined value, the unit 8*b* judges that the torque sensor 2 has been failed, and turns the alarm lamp 4 on via the alarm lamp drive unit 3 (S87). When the absolute value of the cumulative value S is lower than the predetermined value (S85), the step returns to S67.

Embodiment 8

Figure 12:
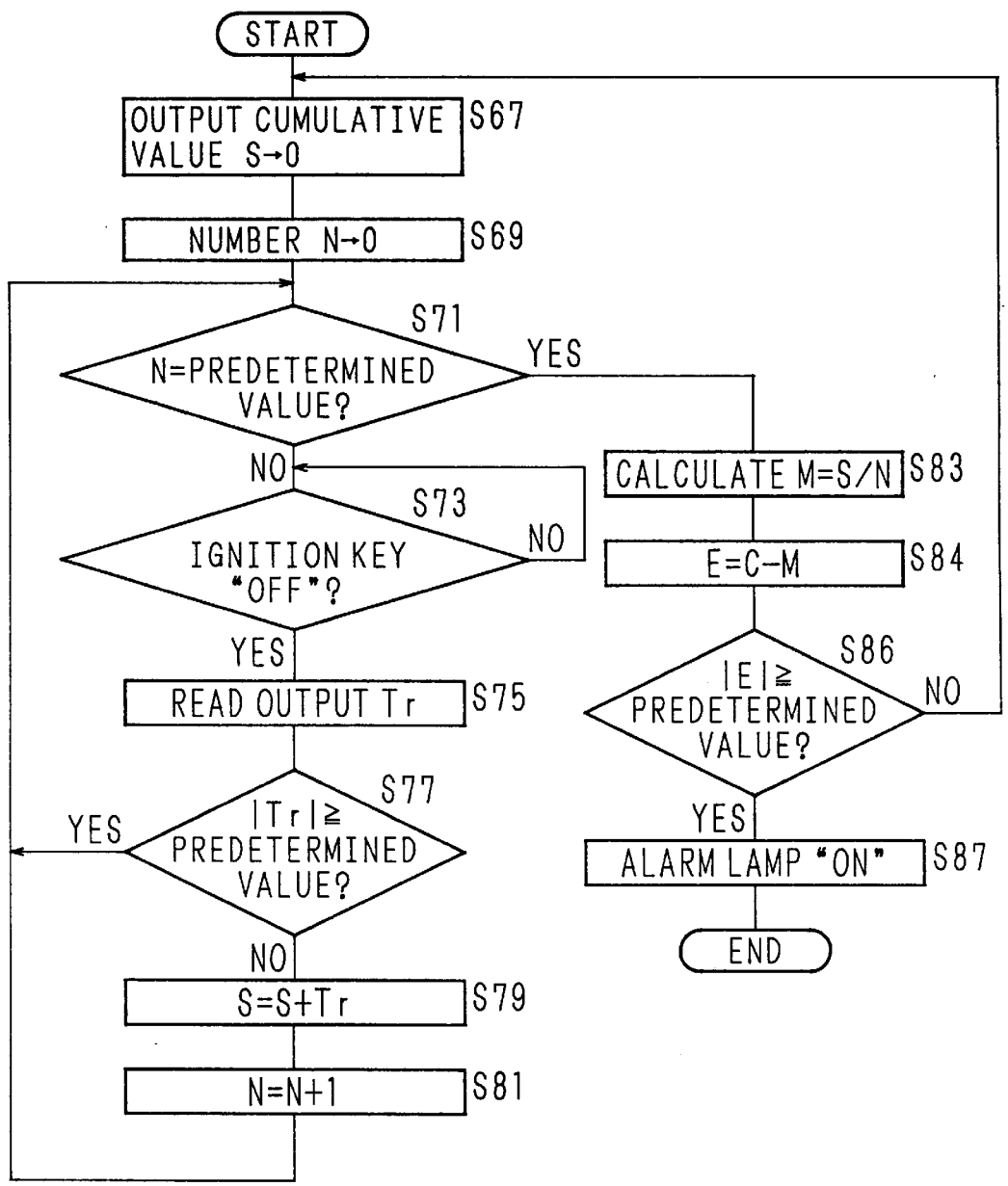
FIG. 12 is a flow chart showing the operation of the electric power steering apparatus according to Embodiment 8 of the present invention.

FIG. 12 is a flow chart showing the operation of the electric power steering apparatus according to Embodiment 8 of the present invention. As a constitution of the essential part of the electric power steering apparatus according to Embodiment 8 of the present invention is similar to the constitution of the essential part of the electric power steering apparatus according to Embodiment 5 of the present invention, further description about the constitution will be omitted.

However, when the output value of the torque sensor 2 when the ignition key ON/OFF detection unit 10 has detected the "OFF" operation of the ignition key is within a predetermined range, the torque sensor malfunction detection unit 8*b* cumulates the output values thereof, and when the cumulated number of times reaches a predetermined number of times, the unit 8*b* obtains an average value M of the output values based on the cumulated value. Next, the unit 8*b* calculates the difference between the value C to be output by the torque sensor 2 at its neutral point and the average value M, and compares the absolute value of the difference with the predetermined value, and when the absolute value of the difference is higher than the predetermined value, the unit 8*b* judges that the torque sensor 2 has been failed, and turns the alarm lamp 4 on via the alarm lamp drive unit 3.

Then, the torque sensor malfunction detection unit 8*b* sets the output cumulative value S to "0" (S67), and the cumulated number of times N to be "0" (S69).

Next, the torque sensor malfunction detection unit 8*b* checks whether or not the number of times N has reached a predetermined number of times (S71), and if not reached the predetermined number of times, the unit 8*b* waits until the detection signal of the "OFF" operation of the ignition key is input from the ignition ON/OFF detection unit 10 (S73).

When the detection signal of the "OFF" operation of the ignition key is input from the ignition key ON/OFF detection unit 10 (S73), the torque sensor malfunction detection unit 8*b* reads the value Tr of the steering torque signal from the torque sensor 2 (S75), and checks whether or not the absolute value of the value Tr is higher than the predetermined value (S77).

When the absolute value of the value Tr is not higher than the predetermined value (when it is within the predetermined range), the torque sensor malfunction detection unit 8*b* adds the value Tr to the cumulative value S (S79).

Next, the torque sensor malfunction detection unit 8*b* adds "1" to the number of times N (S81), and checks whether or not the number of times N has reached the predetermined number of times (S71).

When the number of times N has reached the predetermined number of times (S71), the unit 8b calculates the average value M(=S/N) of the steering torque signal Tr (S83), and next, calculates the difference E (=C−M) between the value C to be output by the torque sensor 2 at its neutral point and the average value M (S84).

Next, the torque sensor malfunction detection unit 8b compares the absolute value of the difference E with the predetermined value (S86), and as a result, when the absolute value of the difference E is higher than the predetermined value, the unit 8b judges that the torque sensor 2 has been failed, and turns the alarm lamp 4 on via the alarm lamp drive unit 3 (S87). When the absolute value of the difference E is lower than the predetermined value (S86), the step returns to S67.

Embodiment 9

Figure 13:
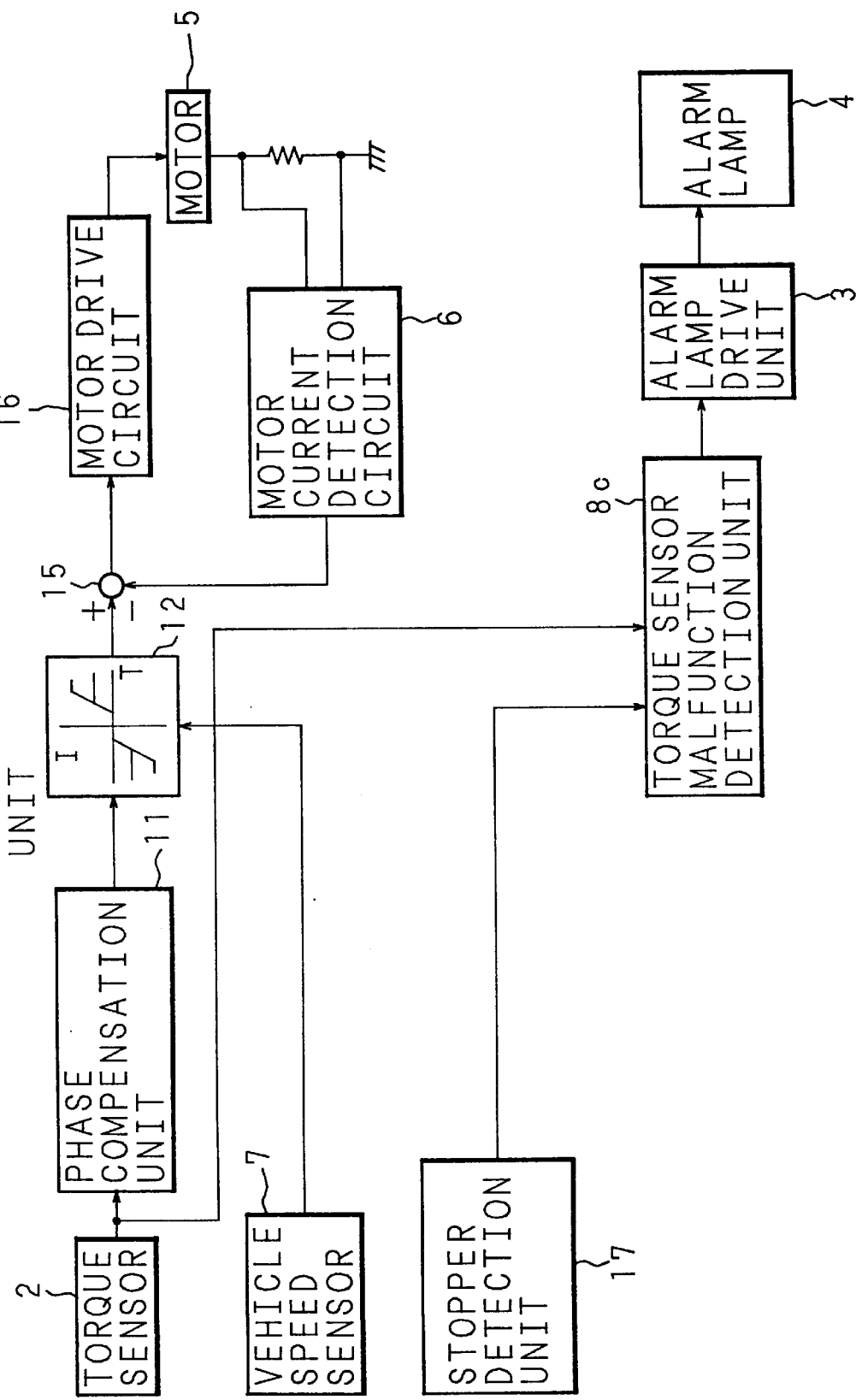
FIG. 13 is a block diagram showing the constitution of the essential part of the electric power steering apparatus according to Embodiment 9 of the present invention.

FIG. 13 is a block diagram showing the constitution of an essential part of the electric power steering apparatus according to Embodiment 9 of the present invention. In this electric power steering apparatus, the vehicle speed signal from the vehicle speed sensor 7 is given to the assist control unit 12.

A detection signal of a stopper detection unit 17 detecting that the torque sensor 2 has reached to a mechanical stopper is given to the torque sensor malfunction detection unit 8c.

The torque sensor malfunction detection unit 8c memorizes output values of the torque sensor 2 when the stopper detection unit 17 detects that the torque sensor 2 has reached the mechanical stopper. Thereafter, at each time of the detection by the stopper detection unit 17 for the above reach, the unit 8c calculates the difference between the output value of the torque sensor 2 at that time and the memorized output value, then compares the absolute value of the difference with the predetermined value, and when the absolute value of the difference is higher than a predetermined value, the unit 8c judges that the torque sensor 2 has been failed, and turns the alarm lamp 4 "ON" via the alarm lamp drive unit 3. As other constitution is similar to the constitution of the essential part of the electric power steering apparatus according to Embodiment 1 of the present invention as described above, further description about the constitution will be omitted.

Figure 14:
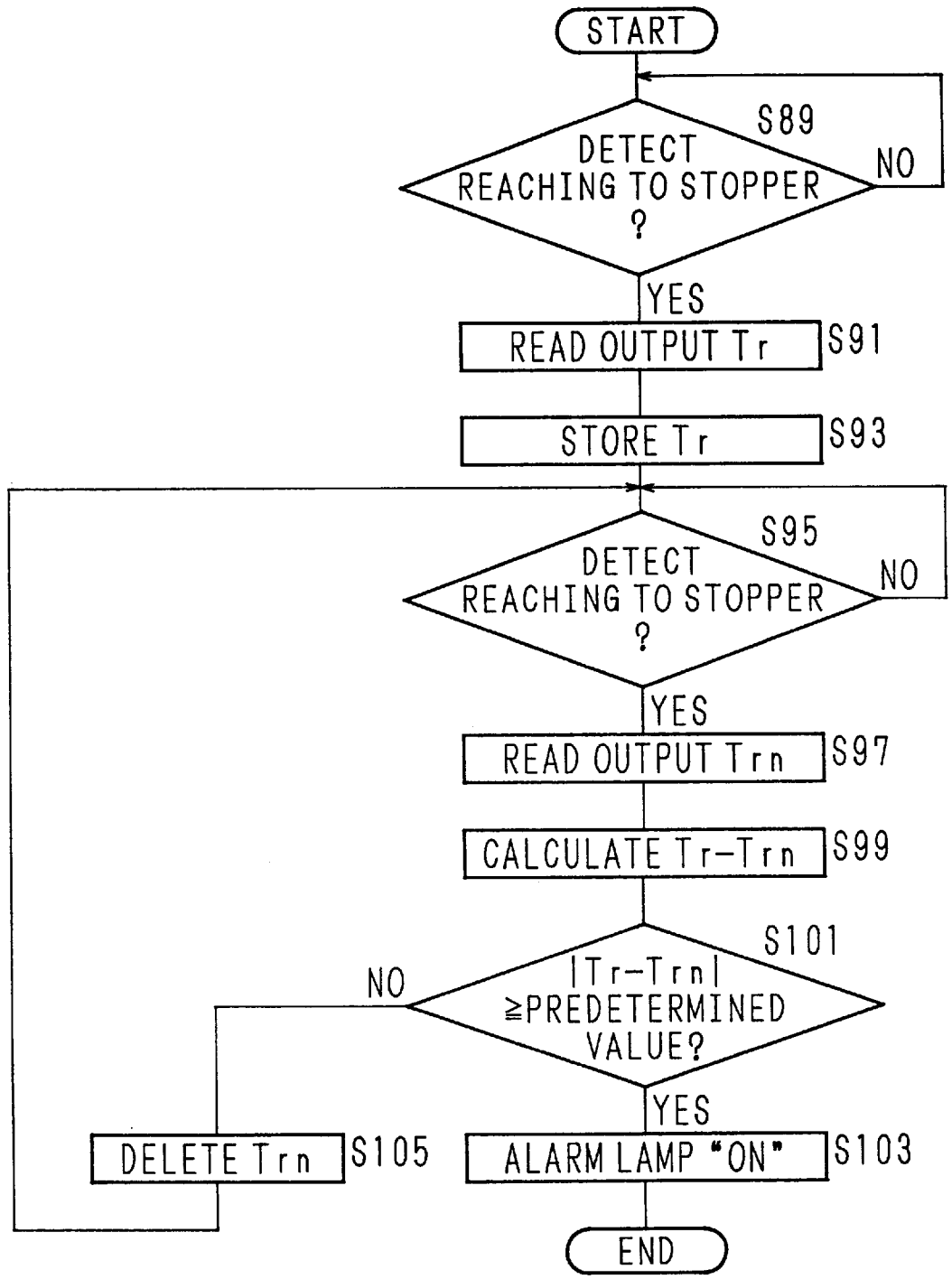
FIG. 14 is a flow chart showing the operation of the electric power steering apparatus according to Embodiment 9 of the present invention.

Hereinafter, an operation of the electric power steering apparatus having the above constitution is explained with reference to a flow chart of FIG. 14 showing it.

FIG. 14 is a flow chart showing the operation of the electric power steering apparatus according to Embodiment 9 of the present invention. At first, the torque sensor malfunction detection unit 8c, when the detection signal is given from the stopper detection unit 17 (S89), reads the output value Tr of the torque sensor 2 (S91), and memorizes the output value Tr (S93)

Next, when the detection signal is given from the stopper detection unit 17 (S95), the torque sensor malfunction detection unit 8c reads the output value Trn of the torque sensor 2 at that time (S97) and calculates the difference between the memorized output value Tr and the read output value Trn (S99). Then, the unit 8c compares the absolute value of the difference with a predetermined value (S101), and when the absolute value of the difference is higher than the predetermined value, the unit 8c judges that the torque sensor 2 has been failed, and turns the alarm lamp 4 "ON" via the alarm lamp drive unit 3 (S103).

In case that the absolute value of the difference is lower than the predetermined value (S101), the torque sensor malfunction detection unit 8c deletes the read output value Trn (S105) and waits until the next detection signal is given from the stopper detection unit 17 (S95).

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus for assisting steering based on an output of a torque sensor which detects a steering torque, comprising:

cumulating means for cumulating the output for a predetermined period of time;

comparing means for comparing an absolute value of the result cumulated by said cumulating means with a predetermined value; and means for detecting a displacement of a detection neutral point of said torque sensor based on the results of comparison by said comparing means.

2. The electric power steering apparatus according to claim 1, further comprising:

a vehicle speed sensor for detecting a vehicle speed; and steering angle detecting means for detecting a steering angle, wherein said cumulating means cumulates when the vehicle speed detected by said vehicle speed sensor is higher than a predetermined vehicle speed and the steering angle detected by said steering angle detecting means is within a predetermined range.

3. The electric power steering apparatus according to claim 1, further comprising:

steering angular velocity detecting means for detecting a steering angular velocity, wherein said cumulating means cumulates when the steering angular velocity detected by said steering angular velocity detecting means is lower than a predetermined steering angular velocity.

4. An electric power steering apparatus for periodically sampling an output of a torque sensor which detects a steering torque and for assisting steering based on the sampled output, comprising:

cumulating means for cumulating the output for a predetermined period of time;

counting means for counting number of times cumulated by said cumulating means;

calculating means for calculating an average value of the output based on the cumulated value cumulated by said cumulating means and the number of times counted by said counting means;

means for calculating a difference between a value to be output by said torque sensor at its neutral point and the average value calculated by said calculating means;

comparing means for comparing an absolute value of the difference calculated by said calculating means with a predetermined value; and means for detecting a displacement of a detection neutral point of said torque sensor based on the results of comparison by said comparing means.

5. The electric power steering apparatus according to claim 4, further comprising:

a vehicle speed sensor for detecting a vehicle speed, and steering angle detecting means for detecting a steering angle, wherein said cumulating means cumulates when the vehicle speed detected by said vehicle speed sensor is higher than a predetermined vehicle speed and the steering angle detected by said steering angle detecting means is within the predetermined range.

6. The electric power steering apparatus according to claim 4, further comprising:

steering angular velocity detecting means for detecting a steering angular velocity, wherein said cumulating means cumulates when the steering angular velocity detected by said steering angular velocity detecting means is lower than a predetermined steering angular velocity.

7. An electric power steering apparatus for assisting steering based on an output of a torque sensor which detects a steering torque, comprising:

means for detecting an "ON" operation of an ignition key;

cumulating means for cumulating the output of said torque sensor at each time a predetermined number of the "ON" operations are detected by said means for detecting;

comparing means for comparing an absolute value of the cumulated value cumulated by said cumulating means with a predetermined value; and means for detecting a displacement of a detection neutral point of said torque sensor based on the results of comparison by said comparing means.

8. The electric power steering apparatus according to claim 7, further comprising:

means for judging whether or not the output of said torque sensor is within a predetermined range, wherein said cumulating means cumulates when the output is judged to be within the predetermined range by said means for judging.

9. An electric power steering apparatus for assisting steering based on an output of a torque sensor which detects a steering torque, comprising;

means for detecting an "ON" operation of an ignition key;

cumulating means for cumulating the output of said torque sensor at each time a predetermined number of the "ON" operations are detected by said means for detecting;

calculating means for calculating an average value of the output based on the cumulated value cumulated by said cumulating means;

means for calculating a difference between a value to be output by said torque sensor at its neutral point and the average value calculated by said calculating means;

comparing means for comparing an absolute value of the difference calculated by said means for calculating with a predetermined value; and means for detecting a displacement of a detection neutral point of said torque sensor based on the results of comparison by said comparing means.

10. The electric power steering apparatus according to claim 9, further comprising:

means for judging whether or not the output of said torque sensor is within a predetermined range, wherein said cumulating means cumulates when the output is judged to be within the predetermined range by said means for judging.

11. An electric power steering apparatus for assisting steering based on an output of a torque sensor which detects a steering torque, comprising:

means for detecting an "OFF" operation of an ignition key;

cumulating means for cumulating the output of said torque sensor at each time a predetermined number of the "OFF" operations are detected by said means for detecting;

comparing means for comparing an absolute value of the cumulated value cumulated by said cumulating means with a predetermined value; and means for detecting a displacement of a detection neutral point of said torque sensor based on the results of comparison by said comparing means.

12. The electric power steering apparatus according to claim 11, further comprising:

means for judging whether or not the output of said torque sensor is within a predetermined range;

wherein said cumulating means cumulates when the output is judged to be within the predetermined range by said means for judging.

13. An electric power steering apparatus for assisting steering based on an output of a torque sensor which detects a steering torque, comprising:

means for detecting an "OFF" operation of an ignition key;

cumulating means for cumulating the output of said torque sensor at each time a predetermined number of the "OFF" operations are detected by said means for detecting;

calculating means for calculating an average value of the output based on the cumulated value cumulated by said cumulating means;

means for calculating a difference between a value to be output by said torque sensor at its neutral point and the average value calculated by said calculating means;

comparing means for comparing an absolute value of the difference calculated by said means for calculating with a predetermined value; and means for detecting a displacement of a detection neutral point of said torque sensor based on the results of comparison by said comparing means.

14. The electric power steering apparatus according to claim 13, further comprising:

means for judging whether or not the output of said torque sensor is within a predetermined range;

wherein said cumulating means cumulates when the output is judged to be within the predetermined range by said means for judging.

15. An electric power steering apparatus for assisting steering based on an output of a torque sensor which includes a mechanical stopper for preventing breakage by over steering and which detects a steering torque, comprising:

stopper detecting means for detecting a reach of said torque sensor to said mechanical stopper;

memory means for memorizing the output of said torque sensor when the reach is detected by said stopper detecting means;

means for calculating a difference between the output of said torque sensor and the output memorized in said memory means, wherein the output is to be detected after the reach at a following reach of said torque sensor to said mechanical stopper by said stopper detecting means;

comparing means for comparing an absolute value of the difference calculated by said means for calculating with a predetermined value; and means for detecting a displacement of a detection neutral point of said torque sensor based on the results of comparison by said comparing means.

* * * * *